May 8, 1951 S. G. FOORD 2,551,591

POLYETHYLENE BONDED TO COPPER BY MEANS OF A LAYER OF CUPROUS OXIDE INTEGRAL WITH COPPER BASE

Filed Oct. 22, 1945

Inventor
STANLEY GEORGE FOORD
by
E. D. Phinney
Attorney

Patented May 8, 1951

2,551,591

UNITED STATES PATENT OFFICE 2,551,591

POLYETHYLENE BONDED TO COPPER BY MEANS OF A LAYER OF CUPROUS OXIDE INTEGRAL WITH COPPER BASE

Stanley George Foord, London, England, assignor, by mesne assignments, to International Standard Electric Corporation, New York, N. Y., a corporation of Delaware Application October 22, 1945, Serial No. 623,767
In Great Britain November 17, 1944

2 Claims. (Cl. 154—129)

This invention relates to a process for bonding solid polymers of ethylene (hereinafter called polythene) to metal surfaces.

Polythene has excellent electrical insulating properties and there are thus many uses possible for such substance if voids in the insulation can be obviated. Such voids are very liable to occur at surfaces at which the insulation is in contact with metal unless the insulation can be satisfactorily bonded to the metal. Polythene does not, however, satisfactorily adhere to metal surfaces and etching or mechanical roughening the surface of the metal does not lead to success.

According to the present invention a process of bonding polythene to copper consists in first oxidising a surface of the copper to cuprous oxide and afterwards pressing the polythene when hot against the oxidised surface.

We have found that good adhesion of polythene to copper can be obtained if the copper is previously heated in an oxidising atmosphere, e. g. in air, to a particular degree of oxidation. Copper when heated to oxidise it goes through the following changes of appearance: bright copper, bright ruby, bright yellowish red, matt salmon pink, matt brownish black. The ruby to pink stages correspond with thin to thick layers of cuprous oxide which are further oxidised to brownish black cupric oxide. Still further oxidation causes the cupric oxide to flake off. We have found that polythene adheres best to copper oxidised to the pink stage or early in the brownish black stage i. e. just before or just after the commencement of the formation of cupric oxide. I have found that if copper be degreased and then oxidised as set out above, polythene adheres so strongly thereto as to be exceedingly difficult to detach therefrom.

Figure 1:
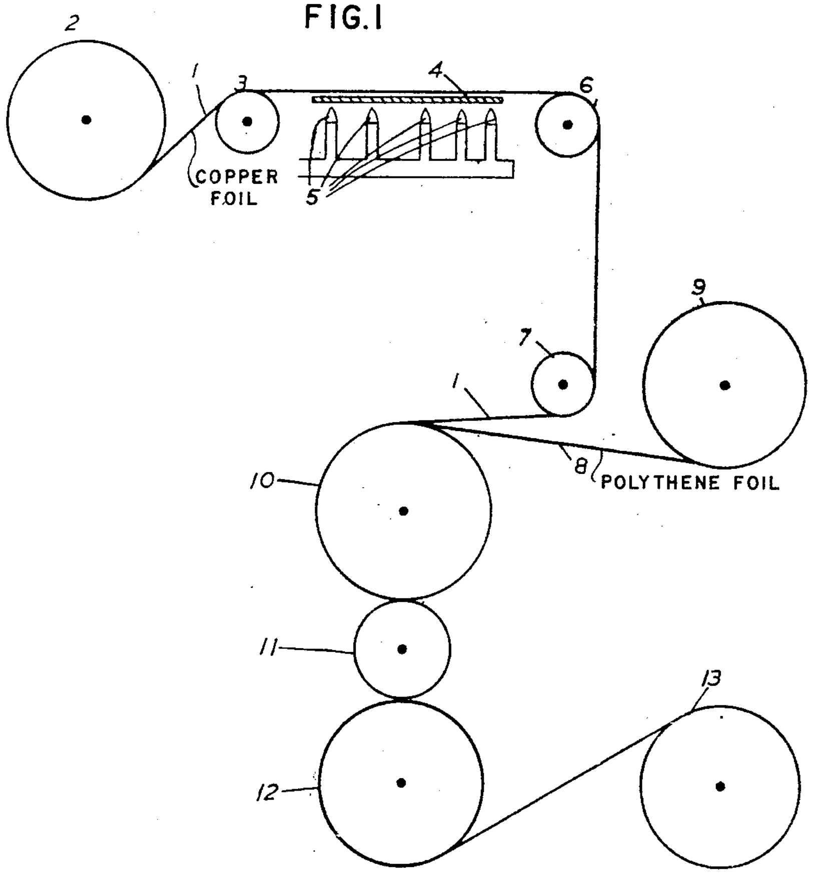
Figure 2:
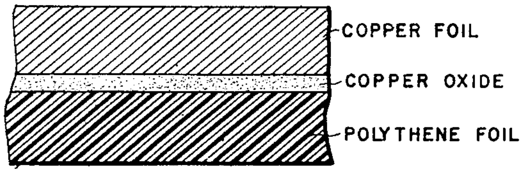

One embodiment of the invention as applied to the formation of polythene-coated copper foil is described with reference to the accompanying drawing, in which Fig. 1 is a diagram of apparatus useful in practicing the present invention, and Fig. 2 is a fragmentary sectional view of an article embodying the principles of this invention.

Referring to Fig. 1 of the drawing, a copper foil 1 is drawn from a supply reel 2 through a bath of carbon tetrachloride (not shown) followed by wipers (not shown) for degreasing, thence over an idler roller 3. From the roller 3 the foil passes a short distance above the surface of an iron-wire gauze 4 which is heated from below by gas flames 5. The time of passage over the heated gauze is such that the upper surface of the foil assumes a pink colour or is just turning brownish black. The oxidised copper foil then passes over idler rollers 6 and 7. A polythene foil 8 is drawn from a supply reel 9 and the oxidised copper foil 1 and polythene foil 8 pass together over a water cooled roller 10 by which they are pressed together against the surface of a roller 11 which is internally heated to 250° C. and is positively driven. The roller 10 not only serves to press the foils 1 and 8 into intimate contact with one another and with the hot roller 11 but ensures that the two foils are fed at a speed equal to the peripheral speed of the hot roller. The two foils pass between roller 11 and a second water cooled roller 12 which is likewise maintained pressed against the hot roller 11 and serves to improve the surface of the polythene and to reduce the space required for cooling off. The polythene coated copper foil is finally taken up on a reel 13 driven through a suitable clutch, which reel is situated at a sufficient distance to ensure adequate cooling of the adhering foils before being wound thereon.

The finished article produced as above described is illustrated in fragmentary view in Fig. 2 from which it will be noticed the article comprises a copper base having a layer of copper oxide thereon and a layer of polythene bonded to the oxide layer.

What is claimed is:

1. As an article of manufacture, a composite laminated structure that comprises a copper surface having a tenaciously adherent layer of polyethylene thereon and, at the interface of the polyethylene layer and the copper surface, a thin layer of cuprous oxide formed by superficially oxidizing the copper surface by heating in an oxidising atmosphere at a temperature such that the copper surface appears to be pink to an early stage of brownish black prior to application of the polyethylene layer thereto by hot pressing.

2. The process that comprises superficially oxidizing a copper surface by heating in an oxidizing atmosphere at a temperature such that the copper surface appears to be pink to an early stage of brownish black to form an adherent layer of cuprous oxide thereon and thereafter hot pressing a layer of polyethylene upon said superficially oxidized surface to form a composite structure comprising the copper surface and the polyethylene layer with a thin layer of cuprous oxide therebetween.

STANLEY GEORGE FOORD.

(References on following page)

REFERENCES CITED

The following references are of record in the file of this patent:

UNITED STATES PATENTS

| Number | Name | Date |
|---|---|---|
| 260,020 | Graecen | June 27, 1882 |
| 516,932 | Hotchkiss | Mar. 20, 1894 |
| 1,877,254 | Ritter | Sept. 12, 1932 |
| 2,065,941 | Lane | Dec. 29, 1936 |
| 2,067,215 | Tanner et al. | Jan. 12, 1937 |
| 2,104,483 | Hewitt | Jan. 4, 1938 |
| 2,149,732 | Groff | Mar. 7, 1939 |
| 2,238,681 | Dorough | Apr. 15, 1941 |
| 2,340,452 | Child et al. | Feb. 1, 1944 |
| 2,406,039 | Roedel | Aug. 20, 1946 |

FOREIGN PATENTS

| Number | Country | Date |
|---|---|---|
| 385,582 | Great Britain | of 1931 |

OTHER REFERENCES

Page 70 of "Organic Chemistry" by Fieser and Fieser, published in 1944 by D. C. Heath & Co., Boston, Mass.